(12) United States Patent
Khaled

(10) Patent No.: US 10,087,810 B2
(45) Date of Patent: Oct. 2, 2018

(54) ASYNCHRONOUS REDUCTANT INSERTION IN AFTERTREATMENT SYSTEMS

(71) Applicant: Cummins Emission Solutions Inc., Columbus, IN (US)

(72) Inventor: Nassim Khaled, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 15/677,749

(22) Filed: Aug. 15, 2017

(65) Prior Publication Data

US 2018/0010508 A1 Jan. 11, 2018

Related U.S. Application Data

(62) Division of application No. 14/848,685, filed on Sep. 9, 2015, now Pat. No. 9,765,674.

(51) Int. Cl.
| | |
|---|---|
| *F01N 3/10* | (2006.01) |
| *F01N 13/00* | (2010.01) |
| *F01N 9/00* | (2006.01) |
| *F01N 3/20* | (2006.01) |
| *B01D 53/94* | (2006.01) |

(52) U.S. Cl.
CPC ..... *F01N 13/0093* (2014.06); *B01D 53/9418* (2013.01); *F01N 3/208* (2013.01); *F01N 3/2066* (2013.01); *F01N 9/00* (2013.01); *F01N 2610/02* (2013.01); *F01N 2610/146* (2013.01); *F01N 2900/1821* (2013.01); *Y02T 10/24* (2013.01); *Y02T 10/47* (2013.01)

(58) Field of Classification Search
CPC ...... F01N 3/206; F01N 3/208; F01N 2570/14; F01N 2610/00

USPC .......................... 422/168, 171, 172; 60/286
See application file for complete search history.

(56) References Cited

U.S. PATENT DOCUMENTS

| | | | |
|---|---|---|---|
| 6,269,633 | B1 | 8/2001 | Van Nieuwstadt et al. |
| 7,485,272 | B2 | 2/2009 | Driscoll et al. |
| 2007/0122317 | A1 | 5/2007 | Driscoll et al. |
| 2015/0096287 | A1* | 4/2015 | Qi .......................... F01N 3/208 60/286 |

FOREIGN PATENT DOCUMENTS

WO   WO-2014/014399    1/2014

OTHER PUBLICATIONS

U.S. Appl. No. 62/087,881, filed Dec. 5, 2014, Heichelbech et al.
Communication issued for European Patent Application No. 16186493.9, dated Dec. 22, 2016, 10 pages.

* cited by examiner

*Primary Examiner* — Tom P Duong
(74) *Attorney, Agent, or Firm* — Foley & Lardner LLP

(57) ABSTRACT

An aftertreatment system comprises a first SCR system, a second SCR system positioned downstream of the SCR system and a reductant storage tank. At least one reductant insertion assembly is fluidly coupled to the reductant storage tank. The at least one reductant insertion assembly is also fluidly coupled to the first SCR system and the SCR system. A controller is communicatively coupled to the reductant insertion assembly. The controller is configured to instruct the reductant insertion assembly to asynchronously insert the reductant into the first SCR system and the second SCR system.

11 Claims, 7 Drawing Sheets

ASYNCHRONOUS REDUCTANT INSERTION IN AFTERTREATMENT SYSTEMS

CROSS-REFERENCE TO RELATED APPLICATIONS

This patent application is a divisional of U.S. patent application Ser. No. 14/848,685 filed Sep. 9, 2015, the contents of which are incorporated herein by reference.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) system to convert $NO_X$ (NO and $NO_2$ in some fraction) into harmless nitrogen gas ($N_2$) and water vapor ($H_2O$) in the presence of ammonia ($NH_3$). Generally in such conventional aftertreatment systems, an exhaust reductant, (e.g., a diesel exhaust fluid such as urea) is injected into the aftertreatment system to provide a source of ammonia, and mixed with the exhaust gas to partially reduce the $NO_X$ gases. The reduction byproducts of the exhaust gas are then fluidically communicated to the catalyst included in the SCR aftertreatment system to decompose substantially all of the $NO_X$ gases into relatively harmless byproducts which are expelled out of such conventional SCR aftertreatment systems.

An exhaust reductant is generally inserted into the SCR system as the source of ammonia to facilitate the reduction of constituents such as $NO_X$ gases of the exhaust gas (e.g., a diesel exhaust gas). The exhaust reductant is stored in a reductant storage tank and communicated to the SCR system. The reductant generally includes an aqueous solution such as an aqueous urea solution. Reductant insertion assemblies are generally used to deliver the reductant from the reductant storage tank. Multiple SCR systems can be included in an aftertreatment system and the reductant has to be delivered to each of the multiple SCR systems at about the same time to prevent any degradation in the catalytic conversion efficiency of each of the multiple SCR systems.

SUMMARY

Embodiments described herein relate generally to systems and methods of delivering reductant to multiple SCR systems included in an aftertreatment system and, in particular, to a reductant insertion assembly and method for asynchronously delivering reductant from a single reductant storage tank to an upstream and a downstream SCR system.

In a first set of embodiments, an aftertreatment system comprises a first SCR system, a second SCR system positioned downstream of the SCR system and a reductant storage tank. At least one reductant insertion assembly is fluidly coupled to the reductant storage tank. The at least one reductant insertion assembly is also fluidly coupled to the first SCR system and the second SCR system. A controller is communicatively coupled to the reductant insertion assembly. The controller is configured to instruct the reductant insertion assembly to asynchronously insert the reductant into the first SCR system and the second SCR system.

In another set of embodiments, a system for asynchronously delivering reductant from a reductant storage tank to a first SCR system and a second SCR system included in an aftertreatment system comprises a reductant insertion assembly fluidly coupled to the reductant storage tank. The reductant insertion assembly is also fluidly coupled to each of the first SCR system and the second SCR system. A control module is communicatively coupled to the reductant insertion assembly. The control module comprises a controller configured to instruct the reductant insertion assembly to asynchronously insert the reductant into the first SCR system and the second SCR system.

In yet another set of embodiments, a method for asynchronously delivering a reductant to a first SCR and a second SCR system of an aftertreatment system via a reductant insertion assembly which includes a first injector fluidly coupled to the first SCR and a second injector fluidly coupled to the second SCR system comprises activating the first injector. The first injector is maintained activated for a first delivery time, thereby inserting a first amount of reductant into the first SCR system. The first injector is deactivated. The second injector is activated. The second injector is maintained activated for a second delivery time, thereby inserting a second amount of reductant into the second SCR system.

In still another set of embodiments, a control module comprises a controller configured to be communicatively coupled to a reductant insertion assembly of an aftertreatment system. The aftertreatment system includes a first SCR system and a second SCR system. The reductant insertion assembly includes a first injector fluidly coupled to the first SCR system, and a second injector fluidly coupled to the second SCR system. The controller includes a timing determination module configured to determine a first activation time at which the first injector is to be activated and a first delivery time for which the first injector is to be selectively activated for delivering a first amount of reductant into the first SCR system. The timing determination module is also configured to determine a second activation time at which the second injector is to be activated, and a second delivery time for which the second injector is to be selectively activated for delivering a second amount of reductant into the second SCR system. A first insertion module is configured to activate the first injector at the first activation time for the first delivery time, thereby delivering the first amount of reductant to the first SCR system. A second insertion module is configured to activate the second injector at the second activation time for the second delivery time, thereby delivering the second amount of reductant to the second SCR system. The first activation time is different from the second activation time.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
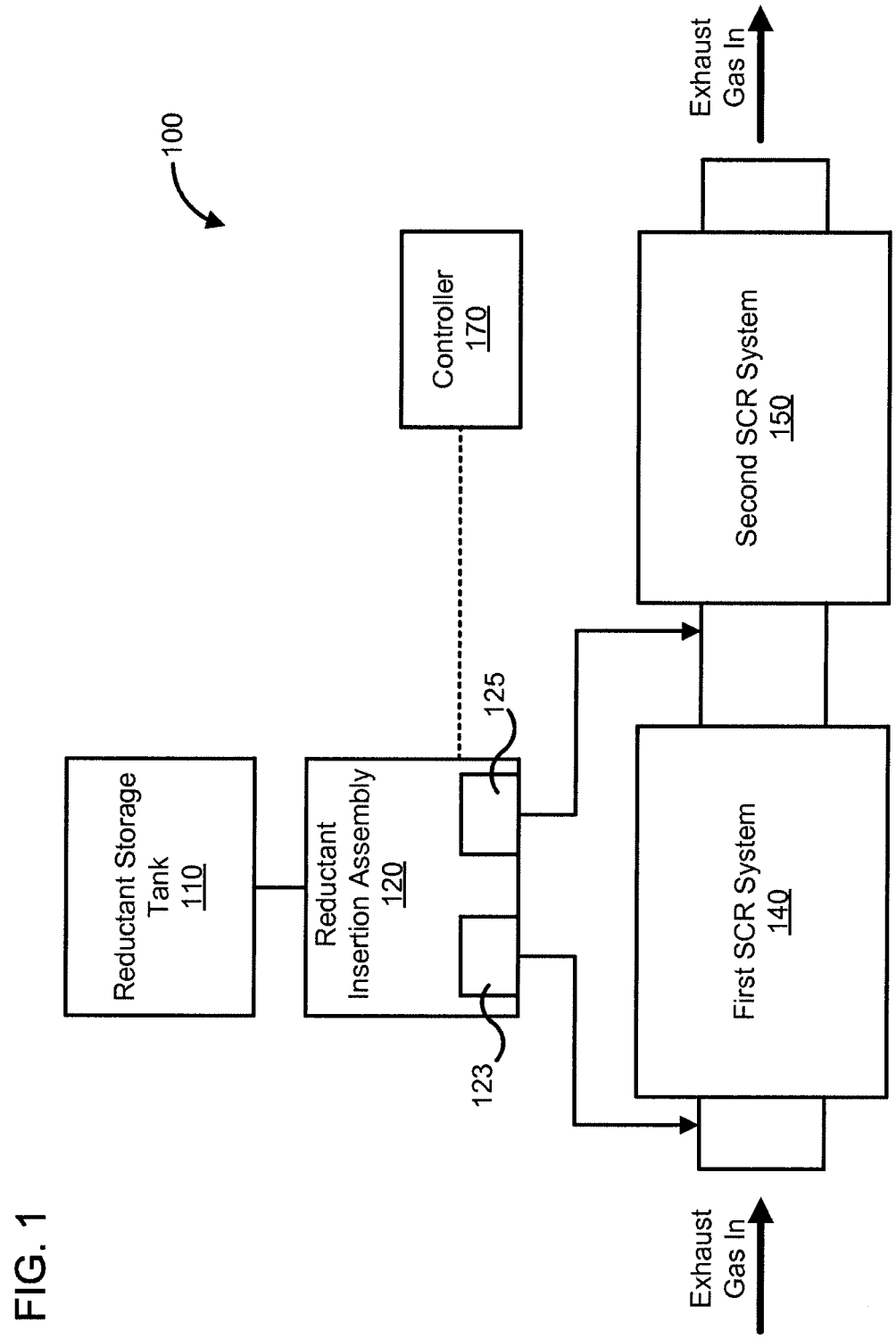
FIG. 1 is a schematic illustration of an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods of delivering reductant to multiple SCR systems included in an aftertreatment system, and in particular, to a reductant insertion assembly and method for asynchronously delivering reductant from a single reductant storage tank to an upstream and a downstream SCR system.

Aftertreatment systems can include multiple SCR systems. It is desirable to deliver reductant to each of the multiple SCR systems at the same time or approximately the same time (e.g., less than a second apart) to prevent any degradation in the catalytic conversion of any one of the SCR systems due to lag in delivering of the reductant thereto. While multiple reductant insertion assemblies and/or reductant storage tanks can be used to deliver the reductant to each of the multiple SCR systems, this can complicate the assembly of such aftertreatment systems as well as raise assembly and/or maintenance costs.

Various embodiments of the systems and methods described herein for delivering reductant to a first SCR system and a second SCR system included in an aftertreatment system may provide benefits include, for example (1) providing reductant to the first SCR system and the second SCR system from a single reductant storage tank; (2) using a reductant insertion assembly which includes a first injector dedicated to deliver reductant only to the first SCR system and a second injector dedicated to delivering reductant only to the second SCR system from a single pump included in the reductant insertion assembly; (3) asynchronously activating the first injector and the second injector so that reductant is delivered to the first SCR system and the second SCR system sequentially; and (4) activating the first injector and the second injector for a very short period of time, e.g., less than 10 milliseconds, so that the reductant is delivered near simultaneously to the first SCR system and the second SCR system, for example within 10 milliseconds of each other.

FIG. 1 is a schematic illustration of an aftertreatment system 100, according to an embodiment. The aftertreatment system 100 is configured to receive an exhaust gas (e.g., a diesel exhaust gas) from an engine (e.g., a diesel engine) and reduce constituents of the exhaust gas such as, for example, $NO_X$ gases, CO, etc. The aftertreatment system 100 includes a reductant storage tank 110 (also referred to herein as "tank 110"), a reductant insertion assembly 120, a first SCR system 140, a second SCR system 150 and a controller 170.

The tank 110 contains an exhaust reductant formulated to facilitate reduction of the constituents of the exhaust gas (e.g., $NO_X$) by a catalyst included in the first SCR system 140 and the second SCR system 150. In embodiments in which the exhaust gas is a diesel exhaust gas, the exhaust reductant can include a diesel exhaust fluid (DEF) which provides a source of ammonia. Suitable DEFs can include urea, aqueous solution of urea or any other DEF (e.g., the DEF available under the tradename ADBLUE®).

The first SCR system 140 is positioned upstream of the second SCR system 150. In other embodiments, the first SCR system 140 and the second SCR system 150 can be positioned in a parallel arrangement. For example, the first SCR system 140 can be positioned on a first bank or leg of the aftertreatment system 100, and the second SCR system 150 can be positioned on a second bank or leg of the aftertreatment system 100 which is parallel to the first bank or leg.

Each of the first SCR system 140 and the second SCR system 150 are configured to receive and treat the exhaust gas (e.g., a diesel exhaust gas) flowing through each of the first SCR system 140 and the second SCR system 150. Each of the first SCR system 140 and the second SCR system 150 are fluidly coupled to the tank 110 to receive the reductant therefrom via the reductant insertion assembly 120, as described herein. In various embodiments, the first SCR system 140 can include a SCR on filter. In such embodiments, the first SCR system 140 is configured to decompose constituents of the exhaust gas as well as filter particulate matter (e.g., soot, carbon, dust, etc.) from the exhaust gas.

Each of the first SCR system 140 and the second SCR system 150 include at least one catalyst positioned within an internal volume defined by a housing of each of the first SCR system 140 and the second SCR system 150. The catalyst is formulated to selectively reduce constituents of the exhaust gas, for example $NO_X$ included in the exhaust gas in the presence of an exhaust reductant. Any suitable catalyst can be used such as, for example, platinum, palladium, rhodium, cerium, iron, manganese, copper, vanadium based catalysts (including combinations thereof).

The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalyst. Such washcoat materials can include, for example, aluminum oxide, titanium dioxide, silicon dioxide, any other suitable washcoat material, or a combination thereof. The exhaust gas can flow over and about the catalyst such that any $NO_X$ gases included in the exhaust gas are further reduced to yield an exhaust gas which is substantially free of carbon monoxide and $NO_X$ gases.

The reductant insertion assembly 120 is fluidly coupled to the tank 110 and each of the first SCR system 140 and the second SCR system 150, and is configured to insert the reductant into each of the first SCR system 140 and the second SCR system 150 from the tank 110, as described herein. The reductant insertion assembly 120 includes a first injector 123 fluidly coupled to the first SCR system 140 and configured to insert the reductant into the first SCR system 140. In various embodiments, a first mixer (not shown) can be positioned upstream of the first SCR system 140. In such embodiments, the first injector 123 is fluidly coupled to the first mixer and is configured to insert the reductant into the first mixer upstream of the first SCR system 140.

The reductant insertion assembly 120 also includes a second injector 125 fluidly coupled to the second SCR system 150 and configured to insert the reductant into the second SCR system 150. In various embodiments, a second mixer (not shown) may be positioned upstream of the second SCR system 150 and downstream of the first SCR system 140. In such embodiments, the second injector 125 is fluidly coupled to the second mixer and configured to insert the reductant into the second mixer upstream of the second SCR system 150.

Each of the first injector 123 and the second injector 125 can include any suitable injector or injection assembly for inserting a predetermined amount of reductant into the first SCR system 140 and the second SCR system 150, respectively. Each of the first injector 123 and the second injector 125 can include valves (e.g., a solenoid valve, a plate valve, a diaphragm valve or any other suitable valve), nozzles, conduits or any other suitable components or otherwise injector for performing the insertion of the reductant into the first SCR system 140 and the second SCR system 150, respectively. In particular embodiments, the reductant insertion assembly 120 may also include a pump (not shown). The pump is fluidly coupled to each of the first injector 123 and the second injector 125 and configured to selectively deliver the reductant from the tank 110 to each of the first injector 123 and the second injector 125 at a predetermined pressure. The pump can include a centrifugal pump, a diaphragm pump, a valve pump, a screw pump or any other suitable pump.

The controller 170 is communicatively coupled to the reductant insertion assembly 120. The controller 170 is configured to instruct the reductant insertion assembly 120 to asynchronously insert the reductant into the first SCR system 140 and the second SCR system 150. The asynchronously inserting includes selectively inserting the reductant only into the first SCR system 140 or only into the second SCR system 150 at any given time. In other words, the reductant is either inserted into the first SCR system 140 or the second SCR system 150 at any given time but not both.

For example, the controller 170 can be communicatively coupled to the first injector 123 and the second injector 125. The controller 170 is configured to activate the first injector 123, thereby initiating insertion of the reductant into the first SCR system 140. The controller 170 maintains the first injector 123 activated for a first delivery time for inserting a first amount of reductant into the first SCR system 140. The controller 170 deactivates the first injector 123, thereby stopping the insertion of the reductant into the first SCR system 140.

The controller 170 then activates the second injector 125, thereby initiating insertion of the reductant into the second SCR system 150. The controller 170 maintains the second injector activated for a second delivery time for inserting a second amount of reductant into the second SCR system 150. The controller 170 can then deactivate the second injector 125 and reactivate the first injector 123 to insert the reductant into the first SCR system 140. In this manner, the controller 170 sequentially activates the first injector 123 and the second injector 125 to sequentially insert the reductant into the first SCR system 140 and the second SCR system 150. The sequential insertion is repeated to allow asynchronous delivery of the reductant to each of the first SCR system 140 and the second SCR system 150.

In various embodiments, each of the first delivery time and the second delivery time can be sufficiently small so that the reductant is delivered almost simultaneously to each of the first SCR system 140 and the second SCR system 150. For example, each of the first delivery time and the second delivery time can be less than 10 milliseconds (e.g., 9, 8, 7, 6 or 5 milliseconds). The chemical kinetics involved in the catalytic conversion of constituents of the exhaust gas by the catalyst of the first SCR system 140 and the second SCR system 150 is a slow process (e.g., occurring over several second).

In contrast, the asynchronous activation of the first injector 123 and the second injector 125 is a rapid process having a less than 10 millisecond lag between activation of the first injector 123 and the second injector 125. Therefore, although the reductant is inserted asynchronously into the first SCR system 140 and the second SCR system 150, the first delivery time and the second delivery time is sufficiently small (e.g., less than 10 milliseconds) so that there is no negative impact on the performance of either the first SCR system 140 or the second SCR system 150. In various embodiments, the first delivery time is equal to the second delivery time so that the first amount of reductant inserted into the first SCR system 140 is equal to the second amount of reductant inserted into the second SCR system 150.

Although not shown in FIG. 1, the aftertreatment system 100 can include sensors such as, for example, temperature sensors, pressure sensors, $NO_X$ sensors, oxygen sensors, ammonia sensors and/or any other sensors. The controller 170 may be communicatively coupled to one or more such sensors to receive and interpret signals from one or more of these sensors. The controller 170 may use the information from one or more of these sensors to determine, for example, the first or second activation time and/or the first or second delivery time.

The controller 170 can include a processor (e.g., a microcontroller) programmed to interpret the output signal. In some embodiments, the controller 170 can be included in a control module (e.g., the control module 271 described herein) which is in electrical communication with one or more of the components of the aftertreatment system 100 described herein and operable to perform the sensing and control functions described herein. In particular embodiments, the controller 170 can also be configured to receive and interpret data from, temperature sensors, $NO_X$ sensors, oxygen sensors and/or ammonia sensors, each of which can be included in the aftertreatment system 100, as described before.

Figure 2:
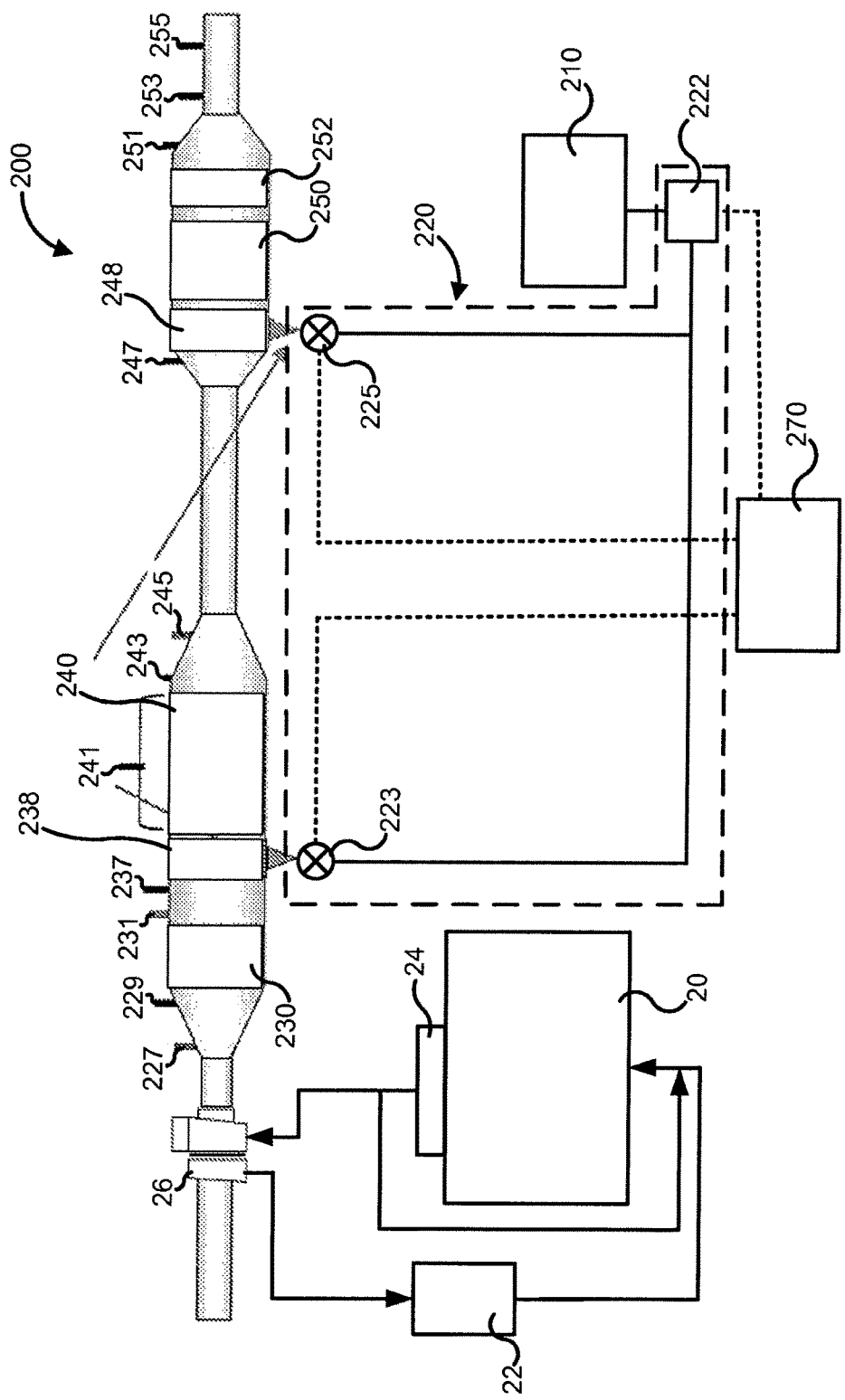
FIG. 2 is an illustration of another embodiment of an aftertreatment system.

FIG. 2 shows another embodiment of an aftertreatment system 200. The aftertreatment system 200 includes a reductant storage tank 210, a reductant insertion assembly 220, a first oxidation catalyst 230, a first mixer 238, a first SCR system 240, a second mixer 248, a second SCR system 250, a second oxidation catalyst 252 and a controller 270. The aftertreatment system 200 is configured to receive an exhaust gas from an engine 20 and decompose constituents (e.g., $NO_X$ gas included in the exhaust gas) and includes a housing within which each of the first oxidation catalyst 230, the first mixer 238, the first SCR system 240, the second mixer 248, the second SCR system 250 and the second oxidation catalyst 252 are positioned.

The engine 20 includes an IC engine which can include a diesel engine, a gasoline engine, a natural gas engine, a biofuel (e.g., biodiesel) engine or a dual-fuel (e.g., diesel and natural gas) engine. The engine 20 produces the exhaust gas which is delivered to the aftertreatment system 200 for decomposing constituents (e.g., $NO_X$ gases) included in the exhaust gas. An exhaust gas recirculation (EGR) system 24 can be fluidly coupled to the engine 20 and configured to recirculate a portion of the exhaust gas generated by the engine to upstream of the engine, for example to reduce a combustion temperature of the fuel in one or more combustion chamber of the engine 20. A charge air cooler 22 can also be fluidly coupled to an intake of the engine 20 and configured to cool the intake air provide to the engine 20, for example after the air has passed through a turbocharger 26 positioned upstream of the first oxidation catalyst 230.

The reductant storage tank 210 (also referred to herein as the "tank 210") contains a reductant, for example a diesel exhaust fluid. The reductant facilitates decomposition of the constituents (e.g., $NO_X$ gases) of the exhaust gas. The tank 210 can be substantially similar to the tank 110 described with respect the aftertreatment system 100, and therefore not described in further detail herein.

The first oxidation catalyst 230 is positioned upstream of the first mixer 238. In various embodiments, the first oxidation catalyst 230 can include a diesel oxidation catalyst configured to reduce CO and unburnt hydrocarbons included in the exhaust gas. A first $NO_X$ sensor 227 and a first temperature sensor 229 are positioned upstream of the first oxidation catalyst 230 and configured to measure an amount of $NO_X$ in the exhaust gas as well as a temperature of the exhaust gas upstream of the first oxidation catalyst 230.

A second $NO_X$ sensor 231 and a second temperature 237 are positioned downstream of the first oxidation catalyst 230 and configured to measure an amount of $NO_X$ in the exhaust gas as well as a temperature of the exhaust gas upstream of the first oxidation catalyst 230. The first mixer 238 is positioned downstream of the first oxidation catalyst 230. The first mixer 238 in configured to receive the reductant and the exhaust gas and include vanes, passages, turbulence generators or any other suitable structures configured to facilitate mixing of the reductant with the exhaust gas.

The first SCR system 240 is positioned downstream of the first mixer 238 and is configured to decompose constituents of the exhaust gas. In various embodiments, the first SCR system 240 can include an SCR on filter, configured to catalytically decompose constituents (e.g., $NO_X$ gases included in the exhaust gas) as well as filter particulate matter included in the exhaust gas. The first SCR system 240 is substantially similar to the first SCR system 140 included in the aftertreatment system 100 and therefore not described in further detail herein. A differential pressure sensor 241 is positioned across the first SCR system 240 and configured to measure a pressure difference across the first SCR system 240. The pressure difference corresponds to a pressure drop across the first SCR system 240 which is indicative of the amount of particular matter trapped in the first SCR system 240. This can be used to determine if the first SCR system 240 (e.g., a SCR on filter) is plugged with particulate matter and thereby, a performance of the first SCR system 240.

A third temperature sensor 243 and an ammonia sensor 245 is positioned downstream of the first SCR system 240 and configured to determine a temperature of the exhaust gas downstream of the first SCR system 240 and an amount of ammonia in the exhaust gas downstream of the first SCR system 240.

The second mixer 248 is positioned downstream of the first SCR system 240. A fourth temperature sensor 247 is positioned proximate to the inlet of the second mixer 248 to determine a temperature of the exhaust gas entering the second mixer 248. The second SCR system 250 is positioned downstream of the second mixer 248 and configured to reduce constituents (e.g., $NO_X$ gases) included in the exhaust gas. The second SCR system 250 can be substantially similar to the second SCR system 150 included in the first aftertreatment system 100 described before, and therefore not described in further detail herein.

The second oxidation catalyst 252 is positioned downstream of the second SCR system 250. In various embodiments, the second oxidation catalyst 252 includes an ammonia oxidation catalyst or an ammonia slip catalyst. The ammonia oxidation catalyst is configured to decompose unconsumed ammonia included in the exhaust gas exiting the second SCR system 250 which is released due to decomposition of a reductant (e.g., an aqueous urea solution) in the first SCR system 240 and/or the second SCR system 250. A fifth temperature sensor 251, a third $NO_X$ sensor 253 and a particulate matter sensor 255 are positioned downstream of the second oxidation catalyst 252 and configured to measure a temperature of the exhaust gas, amount of $NO_X$ in the exhaust gas and amount of particulate matter entrained in the exhaust gas downstream of the second oxidation catalyst 252, respectively.

The reductant insertion assembly 220 is fluidly coupled to the tank 210 and configured to deliver the reductant to each of the first SCR system 240 and the second SCR system 250. As shown in FIG. 2, the reductant insertion assembly 220 includes a pump 222 fluidly coupled to the tank 210. The pump 222 can include a centrifugal pump, a diaphragm pump, a valve pump, a screw pump or any other suitable pump.

The reductant insertion assembly 220 also includes a first injector 223 and a second injector 225. The first injector 223 is fluidly coupled to the first mixer 238 and configured to insert the reductant into the first mixer 238 upstream of the first SCR system 240 to allow the reductant to be efficiently mixed with the exhaust gas before the exhaust gas enters the first SCR system 240. The second injector 225 is fluidly coupled to the second mixer 248 and configured to insert the reductant into the second mixer 248 upstream of the second SCR system 250 to allow the reductant to be efficiently mixed with the exhaust gas before the exhaust gas enters the second SCR system 250.

The pump 222 is fluidly coupled to each of the first injector 223 and the second injector 225 and configured to deliver the reductant from the tank 210 to the first injector 223 and the second injector 225 at a predetermined pressure.

Figure 3:
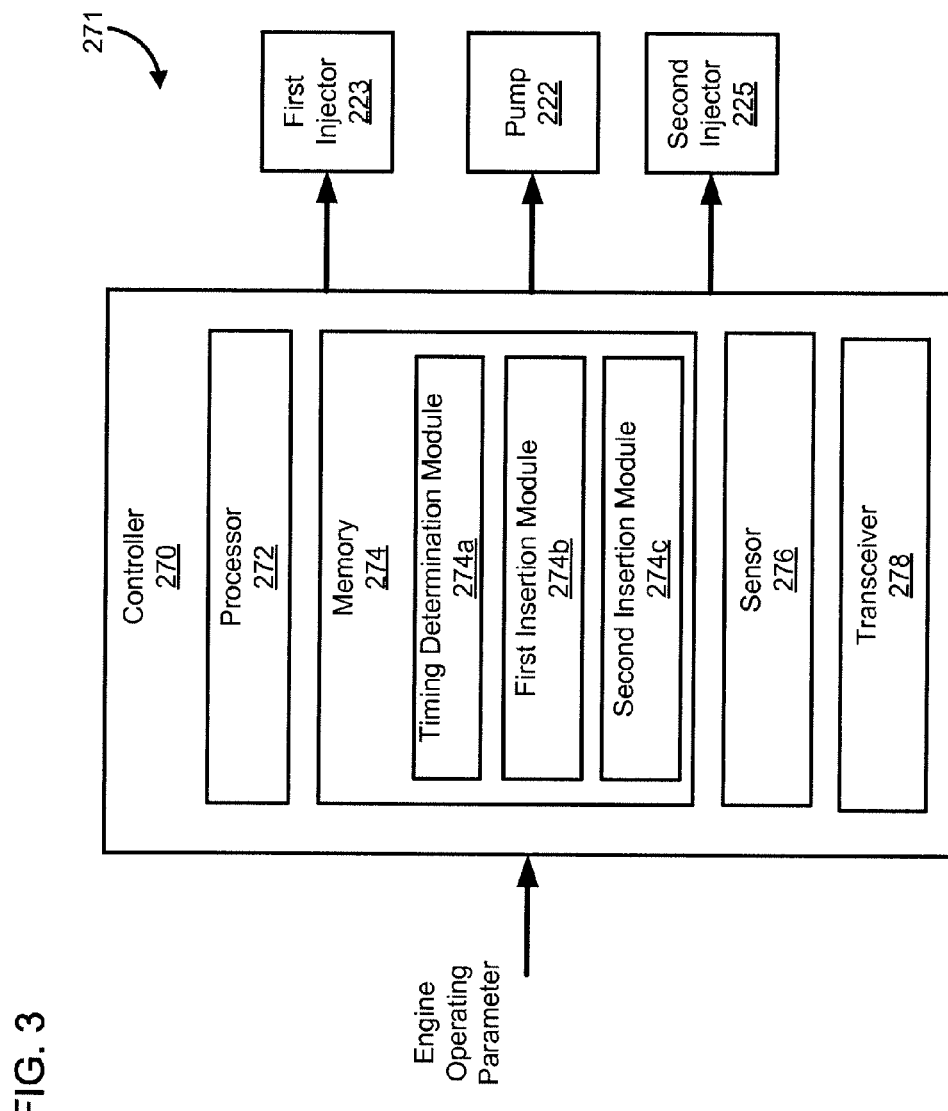
FIG. 3 is a schematic block diagram of a control module that can be included in the aftertreatment system of FIG. 1 and/or FIG. 2.

The controller 270 is communicatively coupled to the reductant insertion assembly 220 and more specifically, to each of the pump 222, the first injector 223 and the second injector 225. The controller 270 can be substantially similar to the controller 170 included in the aftertreatment system 100. In various embodiments, the aftertreatment system 200 includes a control module which includes the controller 270 and is communicatively coupled to the reductant insertion assembly 220. For example, FIG. 3 is a schematic block diagram of a control module 271 that includes the controller 270 according to an embodiment. The controller 270 can be includes a processor 272, a memory 274 or other computer readable medium, a sensor 276 and a transceiver 278. It should be understood that the controller 270 shows only one embodiment of the controller 270 and any other controller capable of performing the operations described herein can be used (e.g., the computing device 630).

The controller 270 is configured to instruct the reductant insertion assembly 220 to asynchronously insert the reductant into the first SCR system 240 and the second SCR system 250. The asynchronously inserting includes inserting the reductant only into the first SCR system 240 or only into the second SCR system 250 at any given time. In various embodiments, the sensor 276 can include an electrical sensor configured to receive and interpret one or more engine operating parameter (e.g., an engine on/off condition, engine load, engine lean/rich condition, etc.) The engine operating parameters can be used to determine an amount of reductant, a pressure at which the reductant is to be delivered, and/or a delivery time of the reductant to be delivered by the first injector 223 and the second injector 225 into the first SCR system 240 and the second SCR system 250, respectively.

The processor 272 can include a microprocessor, programmable logic controller (PLC) chip, an ASIC chip, or any other suitable processor. The processor 272 is in communication with the memory 274 and configured to execute instructions, algorithms, commands or otherwise programs stored in the memory 274.

The memory 274 includes any of the memory and/or storage components discussed herein. For example, memory 274 may include RAM and/or cache of processor 272. Memory 274 may also include one or more storage devices (e.g., hard drives, flash drives, computer readable media, etc.) either local or remote to device controller 270. The memory 274 is configured to store look up tables, algorithms or instructions.

For example, the memory 274 includes a timing determination module 274a. The timing determination module 274a is configured to determine a first activation time at which the first injector 223 is to be activated and a first delivery time for which the first injector 223 is to be maintained opened for delivering a first amount of reductant into the first SCR system 240 (i.e., into the first mixer 238 positioned upstream of the first SCR system 240. The timing determination module 274a is also configured to determine a second activation time at which the second injector 225 is to be activated, and a second delivery time for which the second injector 225 is to be maintained opened for delivering a second amount of reductant into the second SCR system 250 (i.e., into the second mixer 248 positioned upstream of the second SCR system 250). In various embodiments, the timing determination module 274a is configured to interpret one or more engine operating parameters to determine at least one of the first activation time, the first delivery time, the second activation time and/or the second delivery time.

Moreover, the memory 274 also includes a first insertion module 274b and a second insertion module 274c. The first insertion module 274b is configured to activate the first injector 223 at the first activation time for the first delivery time, thereby delivering the first amount of reductant into the first SCR system 240. Similarly, the second insertion module 274c is configured to activate the second injector 225 at the second activation time for the second delivery time, thereby delivering the second amount of reductant into the second SCR system 250.

The controller 270 also includes a transceiver 278 configured to generate a first insertion signal for activating the first injector 223 and a second insertion signal for activating the second injector 225, respectively. The first insertion signal and/or the second insertion signal can include a voltage, a current or any other electrical signal communicated to the first injector 223 and the second injector 225, respectively to perform the activation.

The first and second insertion signal is maintained for the first and second delivery time to deliver the first and second amount of reductant to the first SCR system 240 and the second SCR system 250, respectively. The first activation time is different from the second activation time, for example the second activation time occurs immediately after the first delivery time so that the reductant is asynchronously delivered to the first SCR system 240 and the second SCR system 250 as described before herein.

Figure 4:
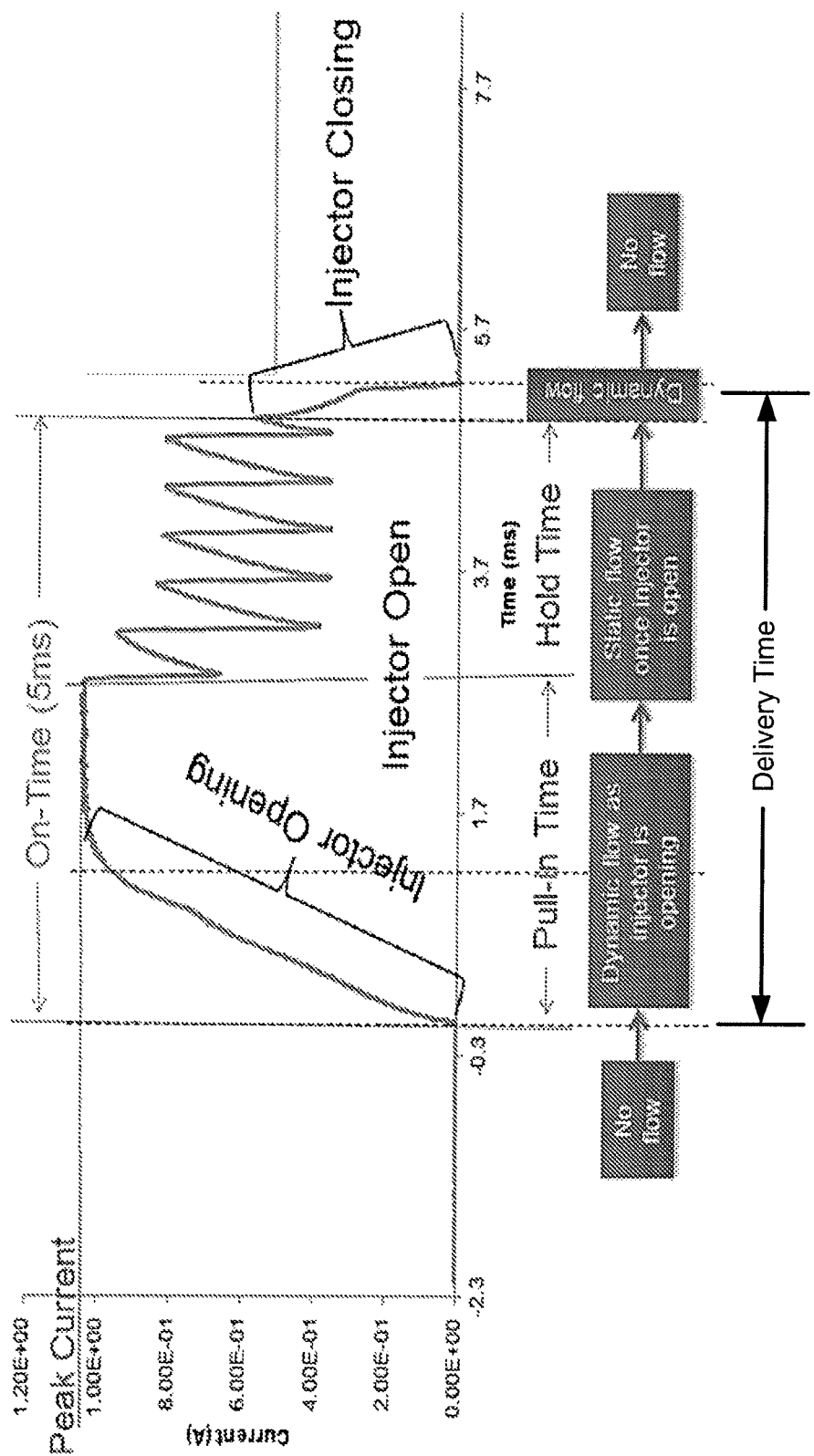
FIG. 4 is a plot of current vs time showing activation of an example injector showing various phases of fluid flow during an activation cycle of the injector.

For example, FIG. 4 is a plot an activation profile of an example injector which can be used as the first injector 223 and/or the second injector 225. The plot shows current on the Y-axis corresponding to a signal current (e.g., generated by the transceiver 278) for activating the injector and the X-axis corresponds to the time. There is no flow through the injector until the injector is opened at the activation time. As the injector is activated, there is dynamic flow through the injector as the injector opens (e.g., a valve of the injector opens) and the reductant is drawn into the injector. This is referred to as the pull in time in FIG. 4.

The reductant is then inserted into the aftertreatment component (e.g., the first SCR system 240 or the second SCR system 250) from the injector which is referred to as the hold time in FIG. 4. The flow through the injector is static once the injector is completely opened. Finally, the injector is deactivated which involves a small time of dynamic flow as the injector is closing until the injector completely closes and the flow completely stops. The sum of the pull in time, the hold time and the closing time define the delivery time (e.g., the first and/or the second delivery time) during which a predetermined amount of reductant (e.g., the first amount or the second amount) of reductant is delivered into the SCR system.

Figure 5:
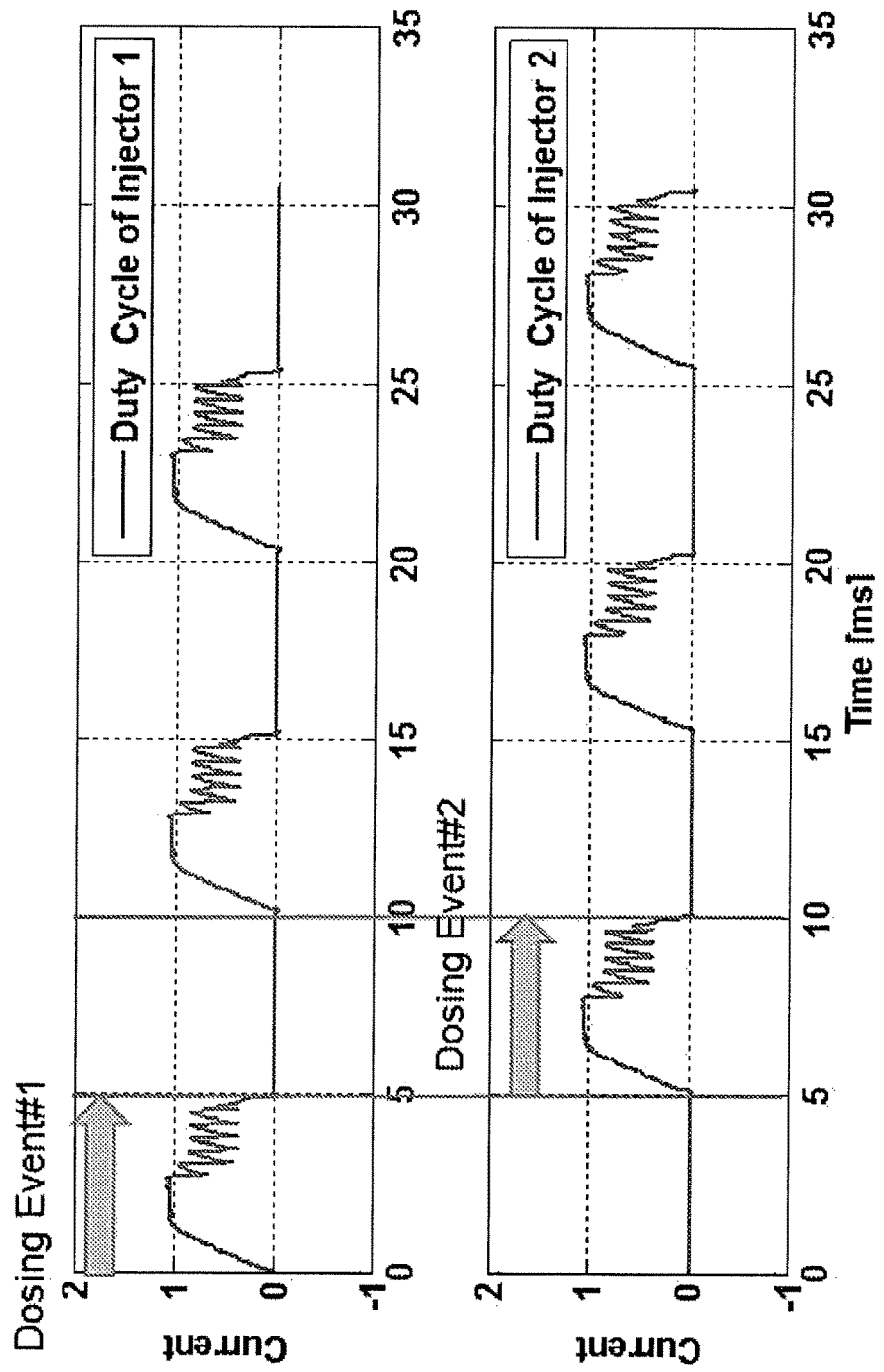
FIG. 5 is a timing diagram showing the time points at which the reductant is inserted into the first SCR system and the second SCR system of FIGS. 1 and/or 2, and the activation duration of a first injector (injector 1) configured to insert the reductant into the first SCR system, and the activation duration of the second injector (injector 2) configured to insert the reductant into the second SCR system.

FIG. 4 shows the delivery time to be 5 milliseconds. In other example embodiments, the delivery time can be less than 10 milliseconds (e.g., 5, 6, 7, 8 or 9 milliseconds inclusive of all ranges and values therebetween). FIG. 5 is a plot of a timing diagram of a first injector (injector 1) and a second injector (injector 2) which include the injector of FIG. 4 and can be used as the first injector 123 or 223 and the second injector 125 or 225, respectively. The timing diagram is configured to asynchronously deliver the reductant to a first SCR system (e.g., the first SCR system 140 or 240) and a second SCR system (e.g., the second SCR system 150 or 250).

As shown in FIG. 5 the first injector is activated at the first activation time (0 milliseconds). The first injector is maintained in the activated positioned for a first delivery time of 5 milliseconds to deliver a first amount of reductant to the first SCR system. The first injector is then deactivated. As soon as the first injector completely deactivates or closes as described with reference to FIG. 4, the second injector is activated. The second injector is maintained in the activated positioned for the second delivery time, to deliver a second amount of reductant to the second SCR system.

The second delivery time is the same as the first delivery time i.e., 5 milliseconds. Therefore an equal amount of reductant is inserted asynchronously into the first SCR system and the second SCR system. In other embodiments, the first delivery time can be different from the second delivery time. As described before, the first delivery time and the second delivery are sufficiently small so that the reductant is delivered near simultaneously to each of the first SCR system and the second SCR system, thereby having minimal or no impact on the performance of each of the first SCR system and the second SCR system, as described before herein.

Figure 6:
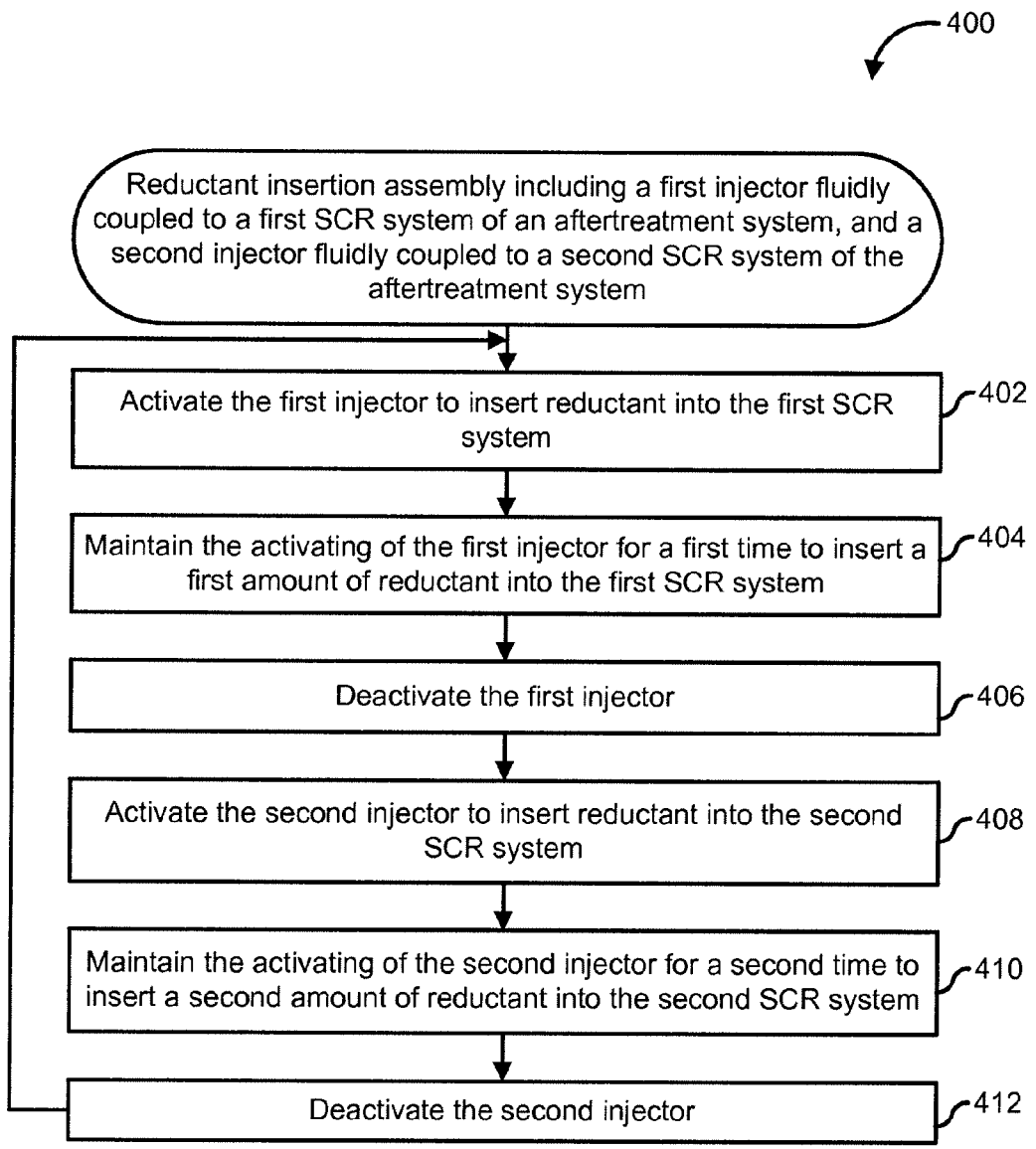
FIG. 6 is a schematic flow diagram of another embodiment of a method of inserting a reductant into a first SCR system and a second SCR system of an aftertreatment system via a reductant insertion assembly fluidly coupled to each of the first SCR system and the second SCR system.

FIG. 6 is a schematic flow diagram of an example method 400 of asynchronously delivering a reductant to a first SCR system (e.g., the first SCR system 140 or 240) and a second SCR system (e.g., the second SCR system 150 or 250) included in an aftertreatment system (e.g., the aftertreatment system 100 or 200) using a reductant insertion assembly (e.g., the reductant insertion assembly 120 or 220) fluidly coupled to the aftertreatment system. The reductant insertion assembly includes a first injector (e.g., the first injector 123 or 223) fluidly coupled to the first SCR system, and a second injector (e.g., the second injector 125 or 225) fluidly coupled to the second SCR system. The operations of the method 400 can be stored in the form of instructions on a non-transitory CRM (e.g., the memory 274 of the controller 270, or main memory 636, read only memory (ROM) 638 or storage device 640 included in the computing device 630 of FIG. 7). The CRM can be included in a computing device (e.g., the computing device 630) which is configured to execute the instructions stored on the CRM to perform the operations of the method 400.

The method 400 includes activating a first injector at 402. For example, the first insertion module 274b of the controller 270 activates the first injector 223 at a first activation time by sending a signal to the first injector 223 via the transceiver 278. The first injector is maintained activated for a first delivery time, thereby inserting a first amount of reductant into the first SCR system at 404. For example, the first insertion module 274b can provide the activation signal to the first injector 223 for the first delivery time to maintain the first injector in the activated or open position for the first delivery time. In various embodiments, the first delivery time is less than 10 milliseconds (e.g., 5, 6, 7, 8 or 9 milliseconds inclusive of all ranges and values therebetween).

The first injector is deactivated at 406. For example, the first insertion module 274b instructs the transceiver to stop the communication of the activation signal to the first injector 223 to deactivate the first injector 223. The second injector is activated at 408. For example, the second insertion module 274c of the controller 270 instructs the transceiver 278 to communicate an activation signal to the second injector 225 at a second activation time to activate the second injector 225. The second activation time occurs immediately after the first delivery time is over, as described before herein.

The second injector is maintained in the activated position for a second delivery time, thereby inserting a second amount of reductant into the second SCR system at 410. For example, the second insertion module 274c can provide the activation signal to the second injector 225 for the second delivery time to maintain the second injector in the activated or open for the second delivery time. The second delivery time can also be less than 10 milliseconds (e.g., 5, 6, 7, 8 or 9 milliseconds inclusive of all ranges and values therebetween). In various embodiments, the second delivery time is equal to the first delivery time (e.g., 5 milliseconds). Furthermore, the first amount of reductant inserted into the first SCR system can be the same as the second amount of reductant inserted into the second SCR system. The second injector is deactivated at 412. The method than returns to operation 402 and the insertion operations are repeated.

Figure 7:
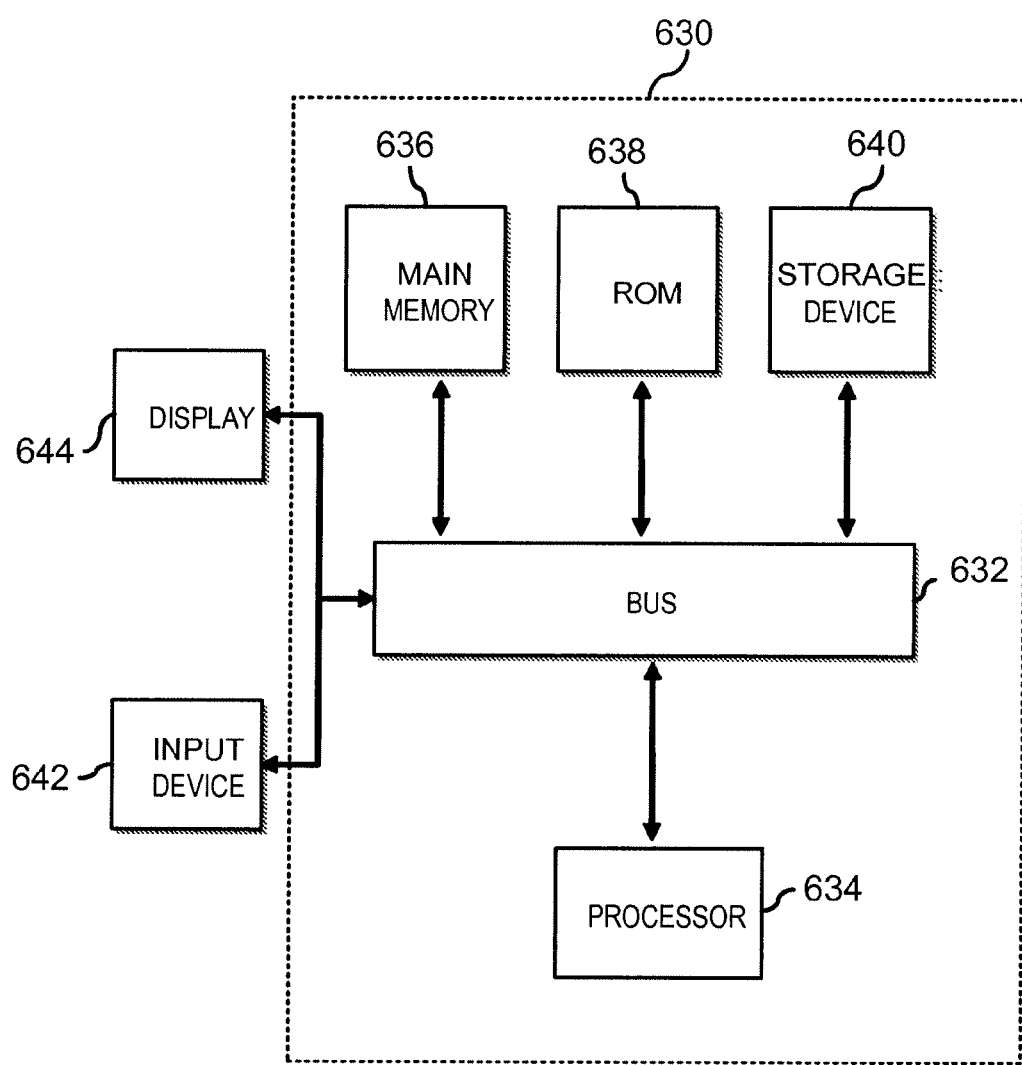
FIG. 7 is a schematic block diagram of an embodiment of a computing device which can be used as a controller included in the aftertreatment systems of FIG. 1 or FIG. 2.

In some embodiments, the controller 170, 270 or any of the controllers described herein can comprise a system computer of an apparatus or system which includes the aftertreatment system 100 or 200 (e.g., a vehicle, an engine or generator set, etc.). For example, FIG. 7 is a block diagram of a computing device 630 in accordance with an illustrative implementation. The computing device 630 can be used to perform any of the methods or the processes described herein, for example the method 400. In some embodiments, the controller 170 or 270 can include the computing device 630. The computing device 630 includes a bus 632 or other communication component for communicating information. The computing device 630 can also include one or more processors 634 or processing circuits coupled to the bus for processing information.

The computing device 630 also includes main memory 636, such as a random access memory (RAM) or other dynamic storage device, coupled to the bus 632 for storing information, and instructions to be executed by the processor 634. Main memory 636 can also be used for storing position information, temporary variables, or other intermediate information during execution of instructions by the processor 634. The computing device 630 may further include ROM 638 or other static storage device coupled to the bus 632 for storing static information and instructions for the processor 634. A storage device 640, such as a solid-state device, magnetic disk or optical disk, is coupled to the bus 632 for persistently storing information and instructions. For example instructions for determining the first activation time, the first delivery time, the second insertion time and the second delivery time can be stored in the storage device.

The computing device 630 may be coupled via the bus 632 to a display 635, such as a liquid crystal display, or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the processes and methods described herein can be implemented by the computing device 630 in response to the processor 634 executing an arrangement of instructions contained in main memory 636 (e.g., the operations of the method 400). Such instructions can be read into main memory 636 from another non-transitory computer-readable medium, such as the storage device 640. Execution of the arrangement of instructions contained in main memory 36 causes the computing device 730 to perform the illustrative processes described herein. One or more processors in a multi-processing arrangement may also be employed to execute the instructions contained in main memory 636. In alternative implementations, hard-wired circuitry may be used in place of or in combination with software instructions to effect illustrative implementations. Thus, implementations are not limited to any specific combination of hardware circuitry and software.

Although an example computing device has been described in FIG. 7, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system for asynchronously delivering reductant from a reductant storage tank to a first selective catalytic reduction system and a second selective catalytic reduction system included in an aftertreatment system, comprising:
 a reductant insertion assembly fluidly coupled to the reductant storage tank, the reductant insertion assembly configured to be fluidly coupled to each of the first selective catalytic reduction system and the second selective catalytic reduction system; and
 a controller communicatively coupled to the reductant insertion assembly, the controller comprising a timing determination module configured to instruct the reductant insertion assembly to insert the reductant into the first selective catalytic reduction system and the second selective catalytic reduction system such that the reductant is inserted into only one of the first selective catalytic reduction system or the second selective catalytic reduction system at any given time.

2. The system of claim 1, wherein the reductant insertion assembly includes:
 a first injector fluidly coupled to the first selective catalytic reduction system; and
 a second injector fluidly coupled to the second selective catalytic reduction system.

3. The system of claim 2, wherein the controller is further configured to:
 activate the first injector;
 maintain the first injector activated for a first delivery time to insert a first amount of reductant into the first selective catalytic reduction system;
 deactivate the first injector;
 activate the second injector; and
 maintain the second injector activated for a second delivery time to insert a second amount of reductant into the second selective catalytic reduction system.

4. The system of claim 3, wherein the first delivery time is equal to the second delivery time.

5. The aftertreatment system of claim 4, wherein the first amount is equal to the second amount.

6. The aftertreatment system of claim 3, wherein the reductant insertion assembly further includes:
 a pump fluidly coupled to each of the first injector and the second injector, the pump delivering the reductant from the reductant storage tank to each of the first injector and the second injector at a predetermined pressure.

7. The aftertreatment system of claim 6, wherein each of the first injector and the second injector include a valve.

8. The aftertreatment system of claim 1, wherein the second selective catalytic reduction system is positioned downstream of the first selective catalytic reduction system.

9. A control module comprising:
 a controller configured to be communicatively coupled to a reductant insertion assembly of an aftertreatment system, the aftertreatment system including a first selective catalytic reduction system and a second selective catalytic system, the reductant insertion assembly including a first injector fluidly coupled to the first selective catalytic reduction system, and a second injector fluidly coupled to the second selective catalytic reduction system, the controller including:
  a timing determination module configured to determine:
   a first activation time at which the first injector is to be activated,
   a first delivery time for which the first injector is to be selectively activated for delivering a first amount of reductant into the first selective catalytic reduction system,
   a second activation time at which the second injector is to be activated, and
   a second delivery time for which the second injector is to be selectively activated for delivering a second amount of reductant into the second selective catalytic reduction system,
   wherein the timing determination module is configured to determine the first and second activation times and the first and second deliverytimes such that the reductant is inserted into only one of the first selective catalytic reduction system or the second selective catalytic reduction system at any given time;
  a first insertion module configured to activate the first injector at the first activation time for the first delivery time, thereby delivering the first amount of reductant into the first selective catalytic reduction system; and
  a second insertion module configured to activate the second injector at the second activation time for the second delivery time, thereby delivering the second amount of reductant into the second selective catalytic reduction system,
  wherein the first activation time is different from the second activation time.

10. The control module of claim 9, wherein the second activation time occurs immediately after the first amount of reductant has been delivered to the first selective catalytic reduction system.

11. The control module of claim 9, wherein the first delivery time is equal to the second delivery time.

* * * * *